United States Patent
Schwarz et al.

(10) Patent No.: US 11,053,815 B2
(45) Date of Patent: Jul. 6, 2021

(54) MULTI-CIRCUIT LUBRICATION SYSTEM FOR A TURBINE ENGINE

(71) Applicant: United Technologies Corporation, Hartford, CT (US)

(72) Inventors: Frederick M. Schwarz, Glastonbury, CT (US); Simon Pickford, Amston, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 714 days.

(21) Appl. No.: 14/765,211

(22) PCT Filed: Feb. 4, 2014

(86) PCT No.: PCT/US2014/014601
§ 371 (c)(1),
(2) Date: Jul. 31, 2015

(87) PCT Pub. No.: WO2014/123863
PCT Pub. Date: Aug. 14, 2014

(65) Prior Publication Data
US 2015/0369082 A1    Dec. 24, 2015

Related U.S. Application Data

(60) Provisional application No. 61/761,495, filed on Feb. 6, 2013.

(51) Int. Cl.
*F01D 25/20* (2006.01)
*F02C 7/14* (2006.01)
(Continued)

(52) U.S. Cl.
CPC .............. *F01D 25/20* (2013.01); *F01D 1/02* (2013.01); *F01D 15/10* (2013.01); *F01D 15/12* (2013.01);
(Continued)

(58) Field of Classification Search
CPC . F02C 7/14; F01D 25/18; F01D 25/20; F01D 25/125; F05D 2260/213; F05D 2260/40311
See application file for complete search history.

(56) References Cited

U.S. PATENT DOCUMENTS 3,218,256 A * 11/1965 Elliott ...................... C10M 3/00
252/389.1
3,722,212 A * 3/1973 Stein ......................... F02C 7/14
184/6.11
(Continued)

OTHER PUBLICATIONS

Lytron Selecting a Heat Exchanger 2011.*
(Continued)

*Primary Examiner* — Gerald L Sung
*Assistant Examiner* — William L Breazeal
(74) *Attorney, Agent, or Firm* — Getz Balich LLC

(57) ABSTRACT

A turbine engine system includes a first lubricant circuit, a second lubricant circuit, a plurality of engine stages and a shaft. The first lubricant circuit includes a first turbine engine component that is fluidly coupled with a first lubricant heat exchanger. The second lubricant circuit includes a second turbine engine component that is fluidly coupled with a second lubricant heat exchanger, wherein the second lubricant circuit is fluidly separate from the first lubricant circuit. The first turbine engine component includes a gear train, which connects a first of the engine stages to a second of the engine stages. The second turbine engine component includes a bearing. The shaft is supported by the bearing and connected to one of the engine stages.

12 Claims, 7 Drawing Sheets

(51) Int. Cl.

| | |
|---|---|
| *F02C 3/107* | (2006.01) |
| *F01D 25/18* | (2006.01) |
| *F01D 25/12* | (2006.01) |
| *F01D 1/02* | (2006.01) |
| *F01D 15/10* | (2006.01) |
| *F01D 15/12* | (2006.01) |
| *F01D 25/08* | (2006.01) |
| *F01D 25/16* | (2006.01) |

(52) U.S. Cl.
CPC ........... *F01D 25/08* (2013.01); *F01D 25/125* (2013.01); *F01D 25/16* (2013.01); *F01D 25/18* (2013.01); *F02C 3/107* (2013.01); *F02C 7/14* (2013.01); *F05D 2220/30* (2013.01); *F05D 2260/20* (2013.01); *F05D 2260/213* (2013.01); *F05D 2260/40311* (2013.01); *F05D 2260/98* (2013.01); *Y02T 50/60* (2013.01)

(56) References Cited

U.S. PATENT DOCUMENTS

| | | | |
|---|---|---|---|
| 3,754,484 | A | 8/1973 | Roberts |
| 4,020,632 | A | 5/1977 | Coffinberry et al. |
| 4,137,705 | A | 2/1979 | Andersen et al. |
| 4,474,001 | A * | 10/1984 | Griffin ................... F02C 7/16 60/204 |
| 4,696,156 | A * | 9/1987 | Burr ................... F01D 25/18 60/39.08 |
| 5,107,676 | A * | 4/1992 | Hadaway ............... F01D 25/18 184/6.11 |
| 5,433,674 | A | 7/1995 | Sheridan et al. |
| 6,223,616 | B1 | 5/2001 | Sheridan |
| 7,387,189 | B2 | 6/2008 | James et al. |
| 7,591,754 | B2 | 9/2009 | Duong et al. |
| 7,824,305 | B2 | 11/2010 | Duong et al. |
| 7,836,680 | B2 | 11/2010 | Schwarz et al. |
| 7,908,840 | B2 | 3/2011 | Schwarz et al. |
| 7,926,260 | B2 | 4/2011 | Sheridan et al. |
| 8,011,884 | B1 | 9/2011 | Murray |
| 8,020,665 | B2 | 9/2011 | Sheridan et al. |
| 8,205,427 | B2 | 6/2012 | Schwarz et al. |
| 8,205,432 | B2 | 6/2012 | Sheridan |
| 8,215,454 | B2 | 7/2012 | Portlock et al. |
| 8,230,974 | B2 | 7/2012 | Parnin |
| 8,246,503 | B2 | 8/2012 | Sheridan et al. |
| 8,256,576 | B2 | 9/2012 | Glahn et al. |
| 8,257,024 | B1 | 9/2012 | Phillips et al. |
| 8,261,527 | B1 | 9/2012 | Stearns et al. |
| 8,777,792 | B2 | 7/2014 | Imai et al. |
| 8,858,388 | B2 * | 10/2014 | McCune ................... F01D 5/027 475/159 |
| 2004/0016601 | A1 | 1/2004 | Brouillet |
| 2004/0194627 | A1 * | 10/2004 | Huang ............... B01D 19/0031 96/6 |
| 2005/0155353 | A1 * | 7/2005 | Sabatino ............... B64D 37/34 60/772 |
| 2005/0211093 | A1 * | 9/2005 | Latulipe ............... B01D 50/002 95/270 |
| 2006/0042223 | A1 * | 3/2006 | Walker ................... F01D 9/065 60/39.08 |
| 2006/0054406 | A1 * | 3/2006 | Delaloye ................ F01D 25/18 184/6.11 |
| 2007/0264133 | A1 | 11/2007 | Schwarz et al. |
| 2008/0110596 | A1 * | 5/2008 | Schwarz ................ F01D 25/08 165/104.11 |
| 2009/0313999 | A1 * | 12/2009 | Hunter ................... F01D 25/18 60/772 |
| 2010/0105516 | A1 * | 4/2010 | Sheridan ................ F01D 25/18 475/346 |
| 2010/0115913 | A1 * | 5/2010 | Bondarenko ............. F02C 7/06 60/39.465 |
| 2010/0212857 | A1 * | 8/2010 | Bulin ................... F02C 7/14 165/41 |
| 2010/0270242 | A1 * | 10/2010 | Paradise ................ F02K 3/04 210/741 |
| 2011/0023444 | A1 | 2/2011 | Veilleux, Jr. |
| 2011/0108360 | A1 * | 5/2011 | DiBenedetto ........... F01D 25/18 184/6.11 |
| 2011/0203293 | A1 * | 8/2011 | Glahn ..................... F02C 7/32 60/785 |
| 2012/0085528 | A1 | 4/2012 | Schwarz et al. |
| 2013/0086909 | A1 * | 4/2013 | Wang ..................... F02C 9/36 60/730 |
| 2014/0182264 | A1 * | 7/2014 | Weisgerber ............ F01D 11/24 60/39.19 |

OTHER PUBLICATIONS

EP Search Report dated Apr. 26, 2016.
Karl Fledderjohn, "The TFE31-5: Evolution of a Decade of Business Jet Service", Business Aircraft Meeting & Exposition, Apr. 12-15, 1983.
Michael Cusick, "Avco Lycoming's ALF 502 High Bypass Fan Engine," Business Aircraft Meeting & Exposition, Apr. 7-10, 1981.
Dickey et al. "The Evolution and Development Status of the ALF 502 Turbofan Engine", National Aerospace Engineering and Manufacturing Meeting, Oct. 2-5, 1972.
"Honeywell TFE731", Jane's Aero-Engines, Jul. 18, 2012.
"Honeywell LF507", Jane's Aero-Engines, Feb. 9, 2012.
"Honeywell LF502", Jane's Aero-Engines, Feb. 9, 2012.
"Rolls-Royce M45H", Jane's Aero-Engines, Feb. 24, 2010.
"Aviadvigatel D-110", Jane's Aero-Engines, Jun. 1, 2010.
"Turbomeca Aubisque", Jane's Aero-Engines, Nov. 2, 2009.
"Ivchenko-Progress D-436", Jane's Aero-Engines, Feb. 8, 2012.
"Ivchenko-Progress AI-727M", Jane's Aero-Engines, Nov. 27, 2011.
"Ivchenko-Progress D-727", Jane's Aero-Engines, Feb. 7, 2012.
"Avco Lycoming ALF502R-2 Cutaway", http://www.flightglobal.com/airspace/media/aeroenginesjetcutaways/avco-lycoming-alf502r-2-cutaway-5582.aspx, Nov. 7, 2007.
"Textron Lycoming LF507F Cutaway", http://www.flightglobal.com/airspace/media/aeroenginesjetcutaways/default.aspx?mq=lycoming+lf507f, Nov. 7, 2007.
"Garrett TFE531 Cutaway", http://www.flightglobal.com/airspace/media/aeroenginesjetcutaways/garrett-tfe531-cutaway-5650.aspx, Nov. 7, 2007.
"Garrett TFE731", http://en.wikipedia.org/wiki/TFE731, Aug. 31, 2012.
"Honeywell LF507", http://en.wikipedia.org/wiki/Honeywell_LF_507, May 4, 2012.
Lycoming ALF 502, http://en.wikipedia.org/wiki/Lycoming_ALF502, May 11, 2012.
"Geared Turbofan" http://en.wikipedia.org/wiki/Geared_turbofan, Oct. 5, 2012.
"ALF 502 Turbofan Engine", https://commerce.honeywell.com/webapp/wcs/stores/servlet/eSystemDisplay?catalogId=10251&storeId=10651&categoryId=31946&langId=-1.
"LF507 Turbofan Engine", http://www.honeywell.com/sites/portal?smap=aerospace&page=Propulsion_Engines3&theme=T5&catID=CDAB5CA0F-004C-6DBB-B50C-20859E156C16&id=H4AF3B740-B3B1-6FB7-9229-2C8E98E7BC80&sel=2.
"Turbofan", http://people.rit.edu/pnveme/EMEM560n/propel/turbofan.html.
"AD: Honeywell", http://www.aero-news.net/Subscribe.cfm?do=main.textpost&id=e8ad917f-adf6-4728-9141-cc1aad5bed8c, Aug. 7, 2009.
"Manufacturing Breakdown", http://www.shockcone.co.uk/bae146/technical.htm.
"TFE731, CFE738 & ATF3 Turbofan Engines", http://www.honeywell.com/sites/portal?smap=aerospace&page=Turbofan-Products&theme=T6.
"Honeywell's Thirty-Plus Year Turbofan Engine Legacy", Business & Commercial Aviation, Nov. 2006, p. 59.
"Engine Retrofits: Something Old, Something New", Business & Commercial Aviation, Dec. 1, 2008, p. 28.
"Not the First GTF", Aviation Week & Space Technology, Aug. 18, 2008, p. 10.

(56) References Cited

OTHER PUBLICATIONS

"More on the Geared Turbofan", Aviation Week & Space Technology, Sep. 28, 2008, p. 8.
"Quiet, Powered-Lift Propulsion", NASA Conference Publication 2077, Nov. 14-15, 1978.

* cited by examiner

MULTI-CIRCUIT LUBRICATION SYSTEM FOR A TURBINE ENGINE

This application claims priority to PCT Patent Application No. PCT/US14/14601 filed Feb. 4, 2014, which claims priority to U.S. Patent Appln. No. 61/761,495 filed Feb. 6, 2013.

BACKGROUND OF THE INVENTION

1. Technical Field

This disclosure relates generally to a turbine engine and, more particularly, to a lubrication system for a turbine engine.

2. Background Information

A typical geared turbofan engine includes a fan section, a compressor section, a combustor section and a turbine section. A rotor of the fan section is connected to and driven by a rotor of the turbine section through a shaft and a gear train. The turbofan engine also includes a lubrication system that circulates lubrication oil through the gear train and a plurality of bearings that support the shaft. The lubrication oil lubricates as well as cools the components of the gear train and the bearings.

There is a need in the art for an improved lubrication system for a turbine engine.

SUMMARY OF THE DISCLOSURE

According to an aspect of the invention, a turbine engine system is provided that includes a first lubricant circuit, a second lubricant circuit, a plurality of engine stages and a shaft. The first lubricant circuit includes a first turbine engine component fluidly coupled with a first lubricant heat exchanger. The second lubricant circuit includes a second turbine engine component fluidly coupled with a second lubricant heat exchanger, wherein the second lubricant circuit is fluidly separate from the first lubricant circuit. The first turbine engine component includes a gear train, which connects a first of the engine stages to a second of the engine stages. The second turbine engine component includes a bearing. The shaft is supported by the bearing, and connected to one of the engine stages.

According to another aspect of the invention, another turbine engine system is provided that includes a first lubricant circuit, a second lubricant circuit, a plurality of engine stages and a shaft. The first lubricant circuit includes a gear train and a first lubricant heat exchanger, and circulates first lubricant through the gear train and the first lubricant heat exchanger. The gear train connects a first of the engine stages to a second of the engine stages. The second lubricant circuit includes a bearing and a second lubricant heat exchanger, and circulates second lubricant through the bearing and the second lubricant heat exchanger. The second lubricant is discrete from the first lubricant. The shaft is supported by the bearing, and connected to one of the engine stages.

According to still another aspect of the invention, a turbine engine system is provided that includes a first lubricant circuit, a second lubricant circuit and a third lubricant circuit. The first lubricant circuit includes a first turbine engine component that is fluidly coupled with a first lubricant heat exchanger. The second lubricant circuit includes a second turbine engine component that is fluidly coupled with a second lubricant heat exchanger, where the second lubricant circuit is fluidly separate from the first lubricant circuit. The third lubricant circuit includes a generator.

The first lubricant circuit may be configured as or include a closed-loop lubricant circuit. In addition or alternatively, the second lubricant circuit may be configured as or include a closed-loop lubricant circuit. In addition or alternatively, the third lubricant circuit may be configured as or include a closed-loop lubricant circuit.

The first lubricant circuit may include a lubricant pump, a lubricant reservoir and/or another lubricant heat exchanger. In addition or alternatively, the second lubricant circuit may include a lubricant pump, a lubricant reservoir and/or another lubricant heat exchanger.

The first lubricant heat exchanger may be configured as or include a lubricant-air heat exchanger with a first airflow area. In addition or alternatively, the second lubricant heat exchanger may be configured as or include a lubricant-air heat exchanger with a second airflow area. The first airflow area may be greater than the second airflow area. Alternatively, the first airflow area may be less than or substantially equal to the second airflow area.

The first lubricant heat exchanger may be configured as or include a lubricant-fuel heat exchanger. In addition or alternatively, the second lubricant heat exchanger may be configured as or include a lubricant-fuel heat exchanger.

The system may include a fuel circuit that is fluidly coupled with a first lubricant-fuel heat exchanger and/or a second lubricant-fuel heat exchanger. The first lubricant heat exchanger may be configured as or include the first lubricant-fuel heat exchanger. The second lubricant heat exchanger may be configured as or include the second lubricant-fuel heat exchanger.

The first of the engine stages may be configured as or include a fan stage, or alternatively any other engine stage. In addition or alternatively, the second of the engine stages may be configured as or include a compressor stage or any other engine stage.

The first lubricant may be a first type of lubricant. The second lubricant may be a second type of lubricant that is different than or substantially the same as the first type of lubricant.

The first lubricant circuit may direct the first lubricant through the gear train at a first pressure. The second lubricant circuit may direct the second lubricant through the bearing at a second pressure that is different than the first pressure.

The system may include a gear train, a bearing, a plurality of engine stages and a shaft supported by the bearing. The first turbine engine component may be configured as or include the gear train, which connects a first of the engine stages to a second of the engine stages. The second turbine engine component may be configured as or include the bearing. The shaft may be connected to one of the engine stages. The first of the engine stages may be configured as or include a fan stage. The second of the engine stages may be configured as or include a compressor stage.

The first turbine engine component may be configured as or include a first bearing. The second turbine engine component may be configured as or include a second bearing. The second turbine engine component may also or alternatively be configured as or include a heat exchanger for cooling electronic equipment.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

DETAILED DESCRIPTION OF THE INVENTION

Figure 1:
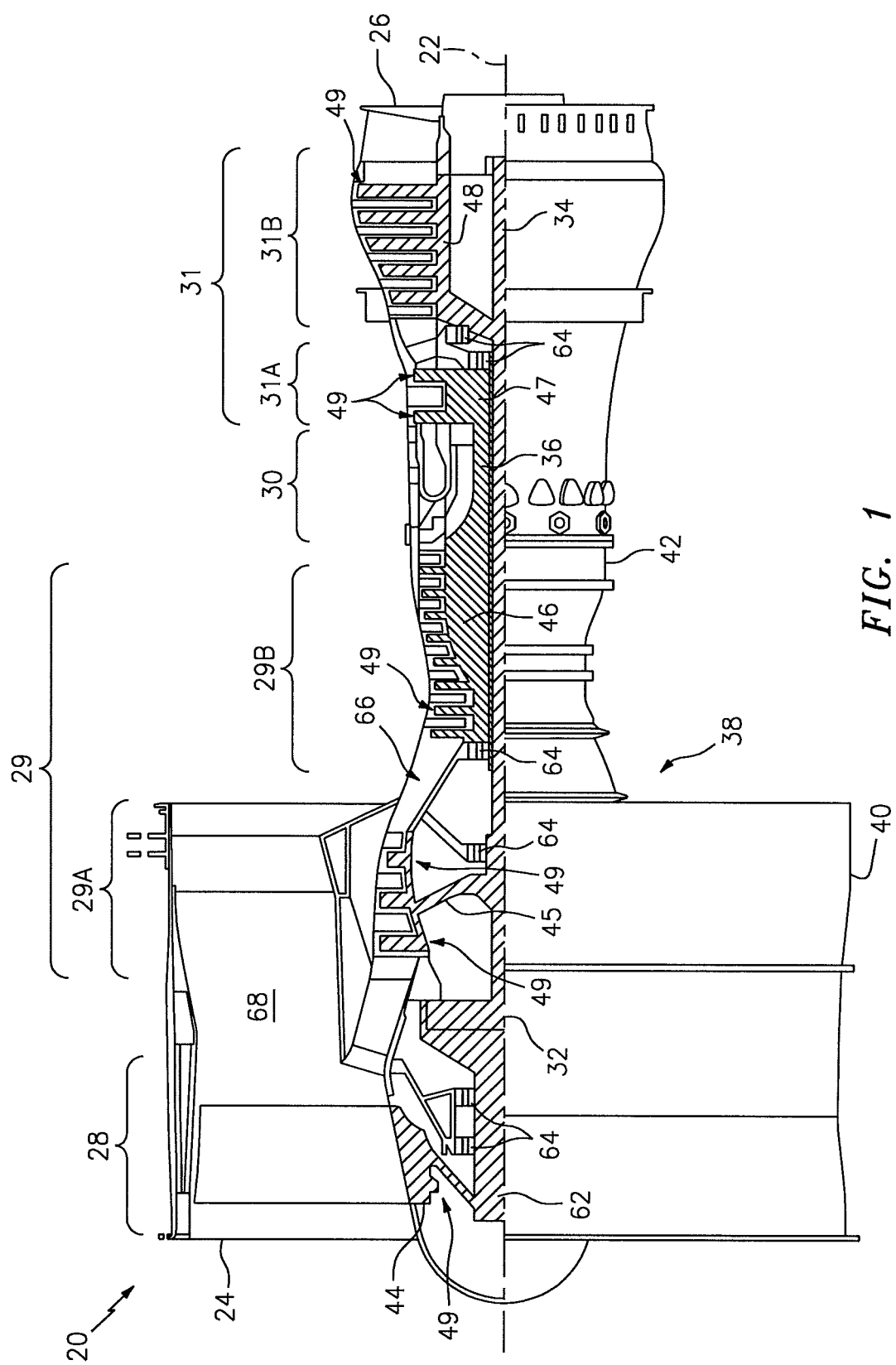
FIG. 1 is a side cutaway illustration of a geared turbine engine.

FIG. 1 is a side cutaway illustration of a geared turbine engine 20 that extends along an axis 22 between an upstream airflow inlet 24 and a downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine 20 also includes a gear train 32 (e.g., an epicyclic gear train), a low speed shaft 34, and a high speed shaft 36.

The engine sections 28-31 are arranged sequentially along the axis 22 within an engine housing 38, which includes a first engine case 40 (e.g., a fan nacelle) and a second engine case 42 (e.g., a core nacelle). Each of the engine sections 28, 29A, 29B, 31A and 31B includes a respective engine rotor 44-48. Each of the engine rotors 44-48 includes one or more engine stages 49, each of which includes a plurality of rotor blades arranged circumferentially around and connected to (e.g., formed integral with or mechanically fastened, welded, brazed or otherwise adhered to) a respective rotor disk.

Figure 2:
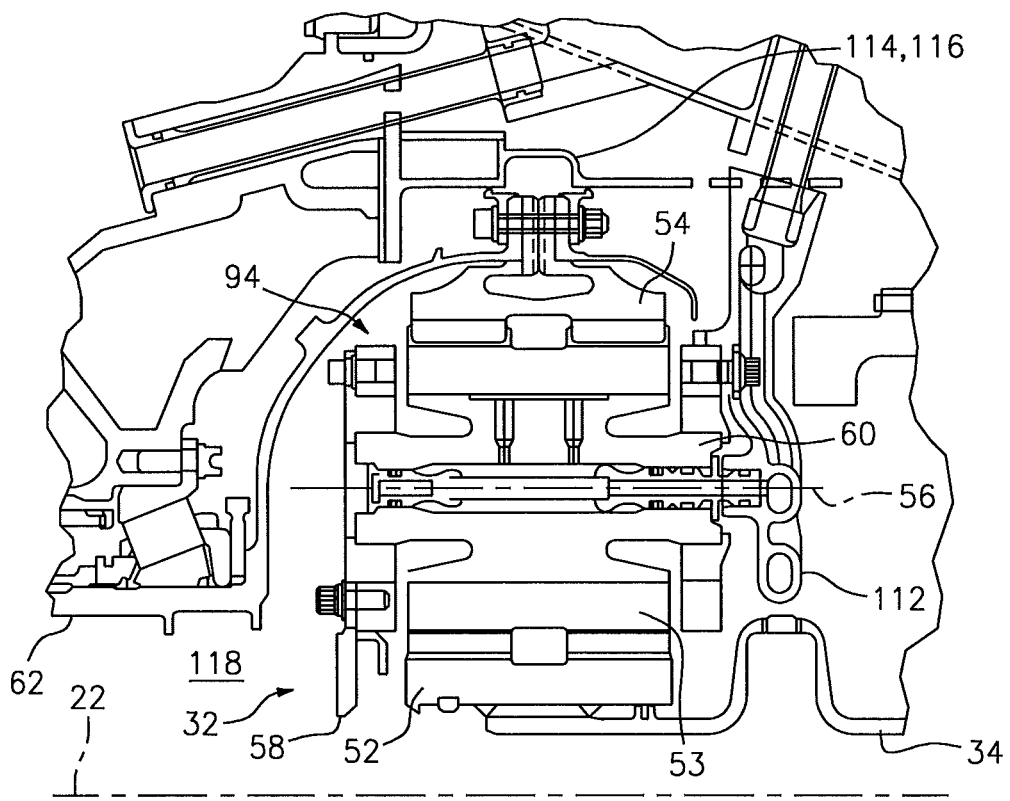
FIG. 2 is a partial sectional illustration of a gear train connected between a plurality of shafts.
Figure 3:
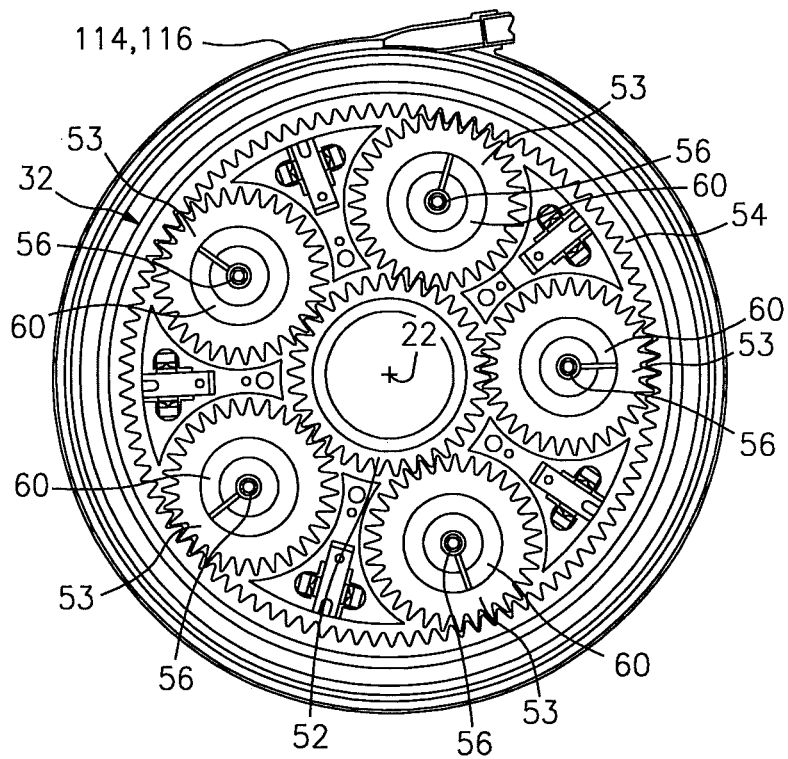
FIG. 3 is a side illustration of the gear train of FIG. 2.

Referring to FIGS. 2 and 3, the gear train 32 includes a plurality of gears 52-54 arranged in a star gear train configuration. Alternatively, the gears 52-54 may be arranged in a planetary gear train configuration, or any other type of gear train configuration. The gears include a sun gear 52, one or more star gears 53, and a ring gear 54.

The sun gear 52 is rotatable about the axis 22. The sun gear 52 is connected to the low speed shaft 34 through a joint such as a spline joint. The star gears 53 are arranged circumferentially around the axis 22. The star gears 53 are radially meshed between the sun gear 52 and the ring gear 54. Each of the star gears 53 is rotatable about a respective axis 56. Each of the star gears 53 is rotatably connected to a stationary gear carrier 58 through a bearing 60. The bearing 60 may be a journal bearing, or alternatively any other type of bearing such as a roller element bearing, etc. The gear carrier 58 is connected to the second engine case 42 (see FIG. 1) through a support strut and/or a flexible support. The ring gear 54 is rotatable about the axis 22. The ring gear 54 is connected to a shaft 62 through a joint such as a bolted flange joint. Referring again to FIG. 1, the shaft 62 is connected to the fan rotor 44. The gear train 32 therefore mechanically connects and transfers power (e.g., torque) between the fan stage 49 of the fan rotor 44 and one or more of the compressor stages 49 of the LPC rotor 45. In other embodiments, however, the gear train 32 may connect and transfer power between a plurality of engine stages of one or more of the engine sections 28-31.

The fan rotor 44 is connected to the gear train 32 through the shaft 62. The gear train 32 and the LPC rotor 45 are connected to and driven by the LPT rotor 48 through the low speed shaft 34. The HPC rotor 46 is connected to and driven by the HPT rotor 47 through the high speed shaft 36. The shaft 62, the low speed shaft 34 and the high speed shaft 36 are rotatably supported by a plurality of shaft support bearings 64. Each of the bearings 64 is connected to the engine housing 38 and the second engine case 42 by at least one stator such as, for example, an annular support strut. One or more of the bearings 64 are each configured as a roller element thrust bearing, or alternatively any other type of roller element bearing. One or more of the bearings 64 may alternatively each be configured as a journal bearing or any other type of bearing.

Air enters the engine 20 through the airflow inlet 24, and is directed through the fan section 28 and into an annular core gas path 66 and an annular bypass gas path 68. The air within the core gas path 66 may be referred to as "core air". The air within the bypass gas path 68 may be referred to as "bypass air" or "cooling air". The core air is directed through the engine sections 29-31 and exits the engine 20 through the airflow exhaust 26. Within the combustor section 30, fuel is injected into and mixed with the core air and ignited to provide forward engine thrust. The bypass air is directed through the bypass gas path 68 and out of the engine 20 to provide additional forward engine thrust or reverse thrust via a thrust reverser. The bypass air may also be utilized to cool various turbine engine components within one or more of the engine sections 29-31.

Figure 4:
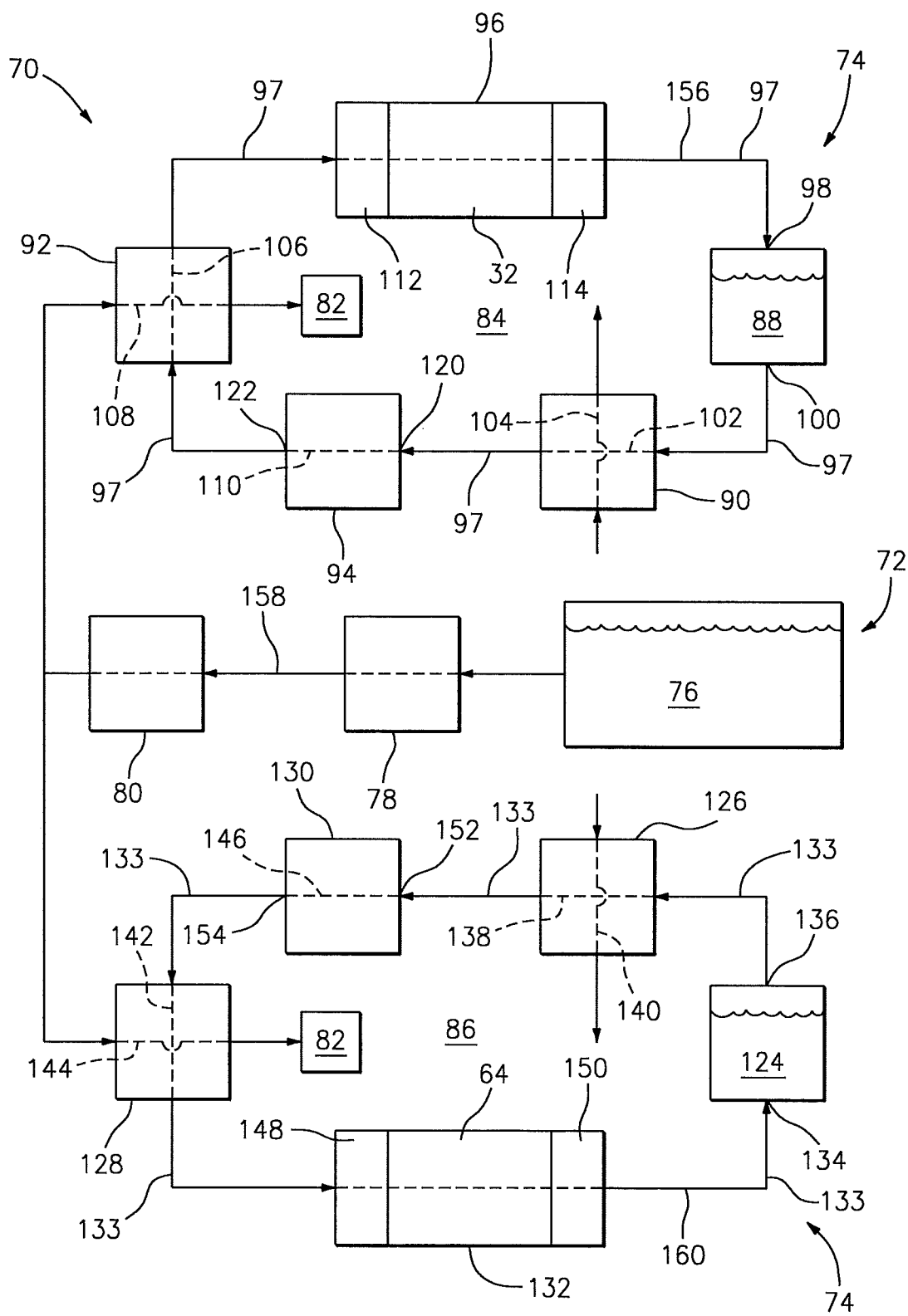
FIG. 4 is a schematic illustration of a turbine engine system for the engine of FIG. 1.

FIG. 4 is a schematic illustration of a turbine engine system 70 for the engine 20 of FIG. 1. The turbine engine system 70 includes a fuel system 72 and a multi-circuit lubrication system 74. The fuel system 72 includes a fuel reservoir 76 (e.g., an aircraft fuel tank) that is fluidly coupled with one or more fuel pumps 78 and 80. The fuel pumps 78 and 80 are fluidly coupled with and direct fuel from the fuel reservoir 76 to one or more injectors 82 included in the combustor section 30 (see FIG. 1).

The lubrication system 74 includes a first lubricant circuit 84 and a second lubricant circuit 86 that is discrete from the first lubricant circuit 84. The second lubricant circuit 86, for example, is fluidly separate from (e.g., not fluidly coupled with) the first lubricant circuit 84. The first lubricant circuit 84 (e.g., a gear train lubricant circuit) provides lubricant to and is fluidly coupled with the gear train 32. The second lubricant circuit 86 (e.g., an engine lubricant circuit) provides lubricant to and is fluidly coupled with one or more of the bearings 64. The first lubricant circuit 84 and/or the second lubricant circuit 86 may also or alternatively each respectively provide lubricant to and be fluidly coupled with one or more other components of the engine 20.

The first lubricant circuit 84 is configured as a closed-loop lubricant circuit. The first lubricant circuit 84 includes a lubricant reservoir 88, one or more lubricant heat exchangers 90 and 92, a lubricant pump 94 and a turbine engine component 96, which are fluidly coupled together by one or more passages 97. One or more of these passages 97 may be defined by one or more conduits (e.g., pipes, hoses, etc.). One or more of the passages 97 may also or alternatively be defined by one or more apertures (e.g., through holes, channels, etc.) that extend through (or into) and/or one or more cavities arranged within one or more respective turbine engine components. The present invention, of course, is not limited to any particular passage types or configurations.

The lubricant reservoir 88 includes an inlet 98 and an outlet 100.

The first lubricant heat exchanger 90 is configured as a lubricant-air heat exchanger such as, for example, a tube and fin radiator. The first lubricant heat exchanger 90 includes a lubricant passage 102 and an air passage 104 (e.g., an air duct). The air passage 104 has an airflow area (e.g., a frontal cross-sectional passage area).

The second lubricant heat exchanger 92 is configured as a lubricant-fuel heat exchanger. The second lubricant heat exchanger 92 includes a lubricant passage 106 and a fuel passage 108. The lubricant passage 106 and the fuel passage 108 are arranged in a cross flow configuration. The lubricant passage 106 and the fuel passage 108, however, may alternatively or additionally be arranged in a counter flow configuration and/or a parallel flow configuration.

The lubricant pump 94 is configured as a mechanical pump. The lubricant pump 94 is driven by a turbine engine component such as an accessory gearbox (not shown), one of the engine rotors 44-48, one of the shafts 34 and 36, or any other rotor included in the engine 20. Alternatively, the lubricant pump 94 may be configured as an electrical pump. The lubricant pump 94 includes a lubricant passage 110.

Referring to FIG. 2, the turbine engine component 96 includes the gear train 32, a lubricant distribution device 112 and a lubricant collection device 114. The lubricant distribution device 112 is configured to direct lubricant to one or more of the gears 52-54 and/or one or more of the bearings 60. The lubricant distribution device 112, for example, may be configured as a lubricant manifold, a lubricant nozzle, etc. The lubricant collection device 114 is configured to temporarily collect lubricant that is discharged from the gear train 32. The lubricant collection device 114 may be configured, for example, as a lubricant collection gutter 116 that at least partially circumscribes the gear train 32. The lubricant collection device 114 may alternatively be configured as or additionally include a sump (not shown) for an engine compartment 118 in which the gear train 32 is located. The present invention, however, is not limited to any particular lubricant collection device or lubricant reservoir types or configurations.

The lubricant reservoir 88, the first lubricant heat exchanger 90, the lubricant pump 94, the second lubricant heat exchanger 92, and the turbine engine component 96 are fluidly coupled serially together. The lubricant passage 102, for example, is fluidly coupled between the outlet 100 and an inlet 120 of the lubricant passage 110. The lubricant passage 106 is fluidly coupled between an outlet 122 of the lubricant passage 110 and the lubricant distribution device 112. The lubricant collection device 114 is fluidly coupled with the inlet 98. The air passage 104 may be fluidly coupled with the bypass gas path 68 (see FIG. 1). The first lubricant heat exchanger 90, for example, may be arranged within the bypass gas path 68, or arranged within a duct that is fluidly coupled with the bypass gas path 68. The fuel passage 108 is fluidly coupled between the fuel pump 80 and the one or more injectors 82.

The second lubricant circuit 86 is configured as a closed-loop lubricant circuit. The second lubricant circuit 86 includes a lubricant reservoir 124, one or more lubricant heat exchangers 126 and 128, a lubricant pump 130 and a turbine engine component 132, which are fluidly coupled together by one or more passages 133. One or more of these passages 133 may be defined by one or more conduits (e.g., pipes, hoses, etc.). One or more of the passages 133 may also or alternatively be defined by one or more apertures (e.g., through holes, channels, etc.) that extend through (or into) and/or one or more cavities arranged within one or more respective turbine engine components. The present invention, of course, is not limited to any particular passage types or configurations.

The lubricant reservoir 124 includes an inlet 134 and an outlet 136.

The first lubricant heat exchanger 126 is configured as a lubricant-air heat exchanger such as, for example, a tube and fin radiator. The first lubricant heat exchanger 126 includes a lubricant passage 138 and an air passage 140 (e.g., an air duct). The air passage 140 has an airflow area (e.g., a frontal cross-sectional passage area), which may be different (e.g., less or greater) than or substantially equal to the airflow area of the air passage 104. In this manner, the first lubricant heat exchangers 90 and 126 may each be tailored to the specific thermal loads of the turbine engine components 96 and 132. The first lubricant heat exchanger 90, for example, may have a higher cooling capacity than that of the first lubricant heat exchanger 126.

The second lubricant heat exchanger 128 is configured as a lubricant-fuel heat exchanger. The second lubricant heat exchanger 128 includes a lubricant passage 142 and a fuel passage 144. The lubricant passage 142 and the fuel passage 144 are arranged in a cross flow configuration. The lubricant passage 142 and the fuel passage 144, however, may alternatively or additionally be arranged in a counter flow configuration and/or a parallel flow configuration.

The lubricant pump 130 is configured as a mechanical pump. The lubricant pump 130 is driven by a turbine engine component such as the accessory gearbox (not shown), one of the engine rotors 44-48, one of the shafts 34 and 36, or any other rotor included in the engine 20. Alternatively, the lubricant pump 130 may be configured as an electrical pump. The lubricant pump 130 includes a lubricant passage 146.

The turbine engine component 132 includes at least one of the bearings 64 supporting the shaft 34, 36 or 62, a lubricant distribution device 148, and a lubricant collection device 150. The lubricant distribution device 148 is configured to direct lubricant to the bearing 64. The lubricant distribution device 148, for example, may be configured as a lubricant manifold, a lubricant nozzle, etc. The lubricant collection device 150 is configured to temporarily collect lubricant discharged from the bearing 64. The lubricant collection device 150 may be configured as, for example, a sump for an engine compartment (e.g., bearing compartment) in which the bearing 64 is located. The present invention, however, is not limited to any particular lubricant collection device or lubricant reservoir types or configurations.

The lubricant reservoir 124, the first lubricant heat exchanger 126, the lubricant pump 130, the second lubricant heat exchanger 128, and the turbine engine component 132 are fluidly coupled serially together. The lubricant passage 138, for example, is fluidly coupled between the outlet 136 and an inlet 152 of the lubricant passage 146. The lubricant passage 142 is fluidly coupled between an outlet 154 of the lubricant passage 146 and the lubricant distribution device 148. The lubricant collection device 150 is fluidly coupled with the inlet 134. The air passage 140 is fluidly coupled with the bypass gas path 68 (see FIG. 1). The first lubricant heat exchanger 126, for example, may be arranged within the bypass gas path 68, or arranged within a duct that is fluidly coupled with the bypass gas path 68. The fuel passage 144 is fluidly coupled between the fuel pump 80 and the one or more injectors 82.

During turbine engine system 70 operation, the lubricant pump 94 circulates first lubricant 156 (e.g., lubrication oil) through the lubricant reservoir 88, the first lubricant heat exchanger 90, the second lubricant heat exchanger 92, and the turbine engine component 96. The first lubricant heat exchanger 90 may transfer heat energy from the first lubricant 156 flowing through the lubricant passage 102 into the bypass air flowing through the air passage 104. The second lubricant heat exchanger 92 may transfer additional heat energy from the first lubricant 156 flowing through the lubricant passage 106 into fuel 158 flowing through the fuel passage 108. The gear train 32 may transfer heat energy into the relatively cool first lubricant 156, thereby cooling the gears 52-54 and/or the bearings 60.

The lubricant pump 130 circulates second lubricant 160 (e.g., lubrication oil) through the lubricant reservoir 124, the first lubricant heat exchanger 126, the second lubricant heat exchanger 128, and the turbine engine component 132. The first lubricant heat exchanger 126 may transfer heat energy from the second lubricant 160 flowing through the lubricant passage 138 into the bypass air flowing through the air passage 140. The second lubricant heat exchanger 128 may transfer additional heat energy from the second lubricant 160 flowing through the lubricant passage 142 into the fuel 158 flowing through the fuel passage 144. The bearing 64 may transfer heat energy into the relatively cool second lubricant 160, thereby cooling the bearing 64.

As set forth above, the first and the second lubricant circuits 84 and 86 are discrete closed loop circuits. The first lubricant 156 circulating within the first lubricant circuit 84 therefore is discrete from (e.g., part of a different lubricant mass than) the second lubricant 160 circulating within the second lubricant circuit 86. As a result, the compositions, viscosities and/or other characteristics of the first and the second lubricants 156 and 160 may be respectively tailored to, for example, the cooling requirements for the turbine engine components 96 and 132. The first lubricant 156 therefore may be a first type of lubricant, and the second lubricant 160 may be a second type of lubricant that is different than (or the same as) the first type of lubricant.

In addition to the foregoing, the configurations of the first and the second lubricant circuits 84 and 86 may be respectively tailored to, for example, the cooling requirements for the turbine engine components 96 and 132. One or more of the lubricant heat exchangers 90 and 92, for example, may be sized and configured based on how much heat energy the gear train 32 generates during engine operation. One or more of the lubricant heat exchangers 126 and 128 may be sized and configured based on how much heat energy the bearing 64 generates during engine operation. In this manner, the first lubricant circuit 84 may cool the first lubricant 156 to a different (e.g., lower) temperature than the second lubricant circuit 86 cools the second lubricant 160. In another example, the lubricant pump 94 may be configured to direct the first lubricant 156 through the turbine engine component 96 at a first pressure. The lubricant pump 130 may be configured to direct the second lubricant 160 through the turbine engine component 132 at a second pressure, which may be different (e.g., less) than or substantially equal to the first pressure.

Figure 5:
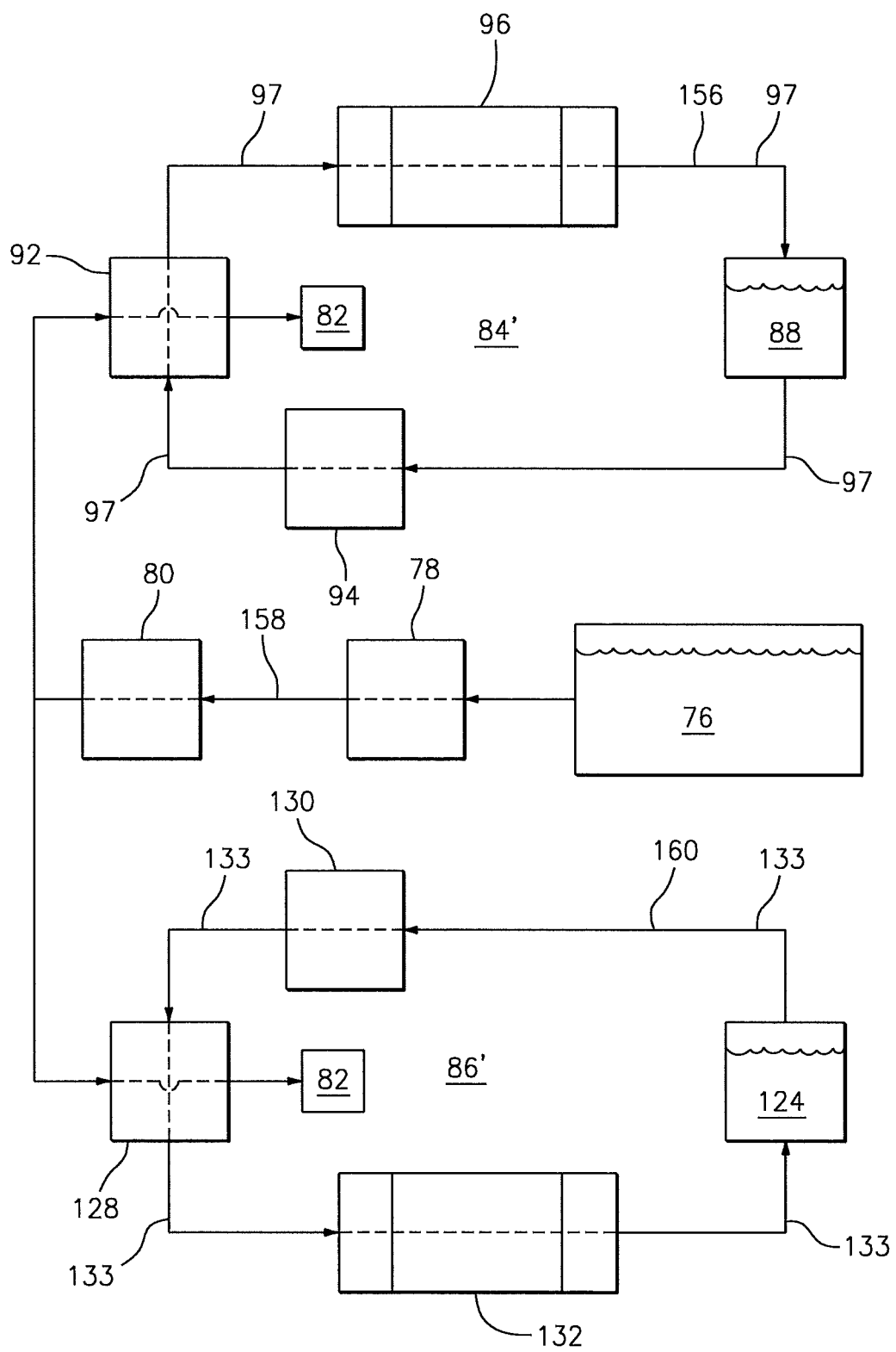
FIG. 5 is a schematic illustration of another turbine engine system for the engine of FIG. 1.
Figure 6:
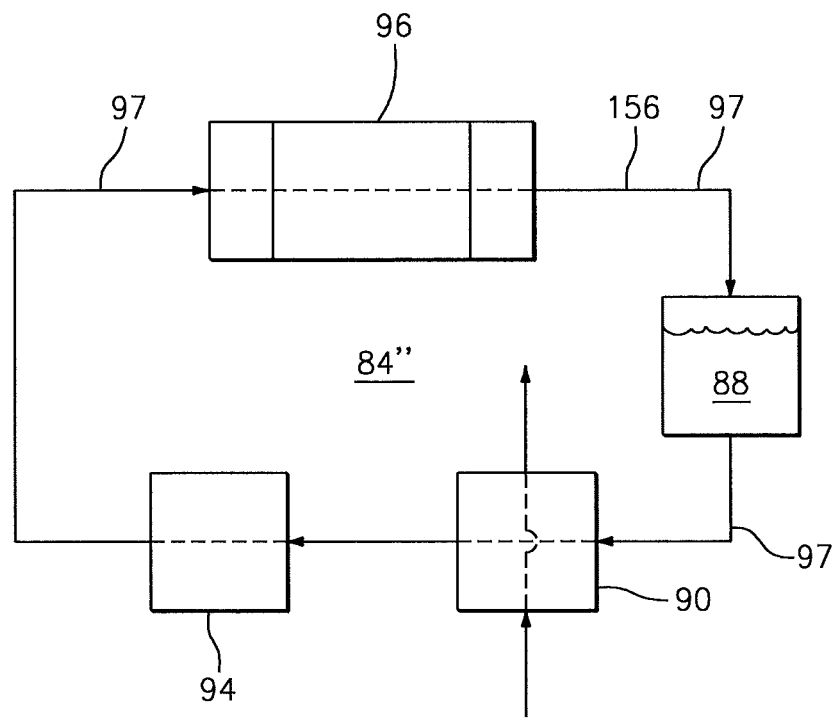
FIG. 6 is a schematic illustration of another turbine engine system for the engine of FIG. 1.
Figure 6:
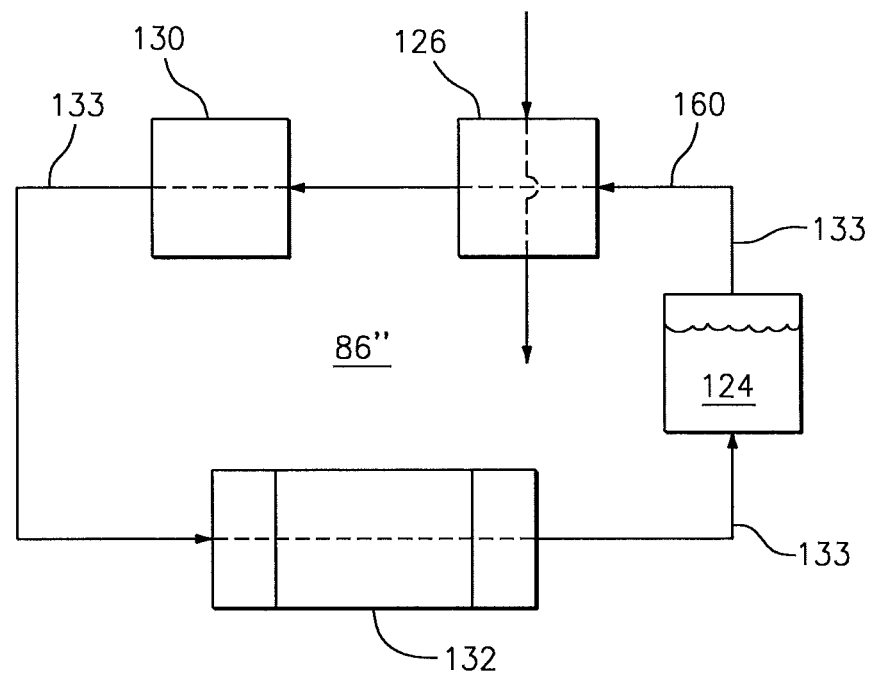
Figure 7:
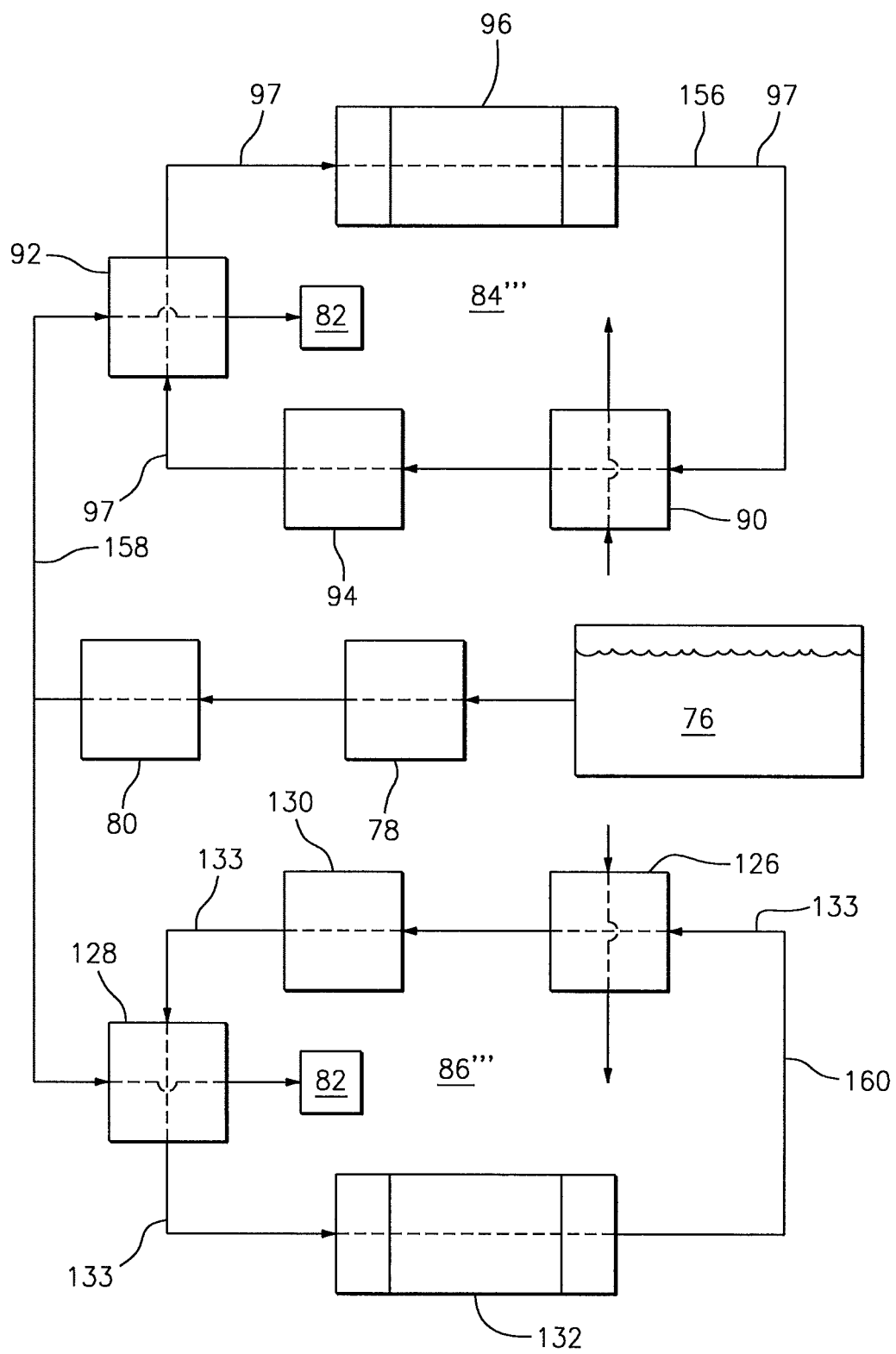
FIG. 7 is a schematic illustration of another turbine engine system for the engine of FIG. 1.

One or more of the lubricant circuits 84 and 86 may have various configurations other than that described above. For example, referring to FIG. 5, one or more of the lubricant circuits 84' and 86' may be respectively configured without the first lubricant heat exchangers 90 and 126. Referring to FIG. 6, one or more of the lubricant circuits 84" and 86" may be respectively configured without the second lubricant heat exchangers 92 and 128. Referring to FIG. 7, one or more of the lubricant circuits 84''' and 86''' may be respectively configured without the lubricant reservoirs 88 and 124. One or more of the lubricant circuits 84 and 86 may each include one or more additional lubrication system components such as, for example, a lubricant filtering device, an oil strainer (e.g., a last chance strainer), a pressure regulator, a deoiler, a chip detector or any other type of lubricant conditioning and/or monitoring device. One or more of the first and the second lubricant circuits 84 and 86 may each include a valve for regulating air flowing through the respective air passage 104, 140. One or more of the components of the first and/or the second lubricant circuits 84 and 86 may be arranged and fluidly coupled in various serial and/or parallel configurations other than those described above and illustrated in the drawings. The present invention therefore is not limited to any particular lubricant circuit configurations.

One or more of the lubrication system components 88, 90, 92, 94, 96, 124, 126, 128, 130 and 132 may have various configurations other than those described above and illustrated in the drawings. For example, one or more of the turbine engine components 96 and 132 may each alternatively or additionally include at least another one of the bearings 64 supporting at least one of the shafts 34, 36 and 62. One of the turbine engine components 96 and 132 may alternatively or additionally include a heat exchanger for cooling electronic equipments such as aircraft avionics, a high powered sensor system, etc. One or more of the turbine engine components 96 and 132 may each alternatively or additionally include one or more seals and/or any other type of turbine engine component that receives lubricant for lubrication, cooling and/or heating. The lubricant pumps 94 and 130 may be configured with a common housing and/or may be driven by a common shaft connected to discrete impellers. One or more of the passages 102, 104, 106, 108, 138, 140, 142 and 144 may each include a plurality of parallel sub-passages. One or more of the passages 102, 104, 106, 108, 138, 140, 142 and 144 may each include one or more heat transfer enhancement features such as ribs, pedestals and/or any other types of protrusions and/or recesses that increase surface area of the passage. The present invention therefore is not limited to any particular lubrication system components.

Figure 8:
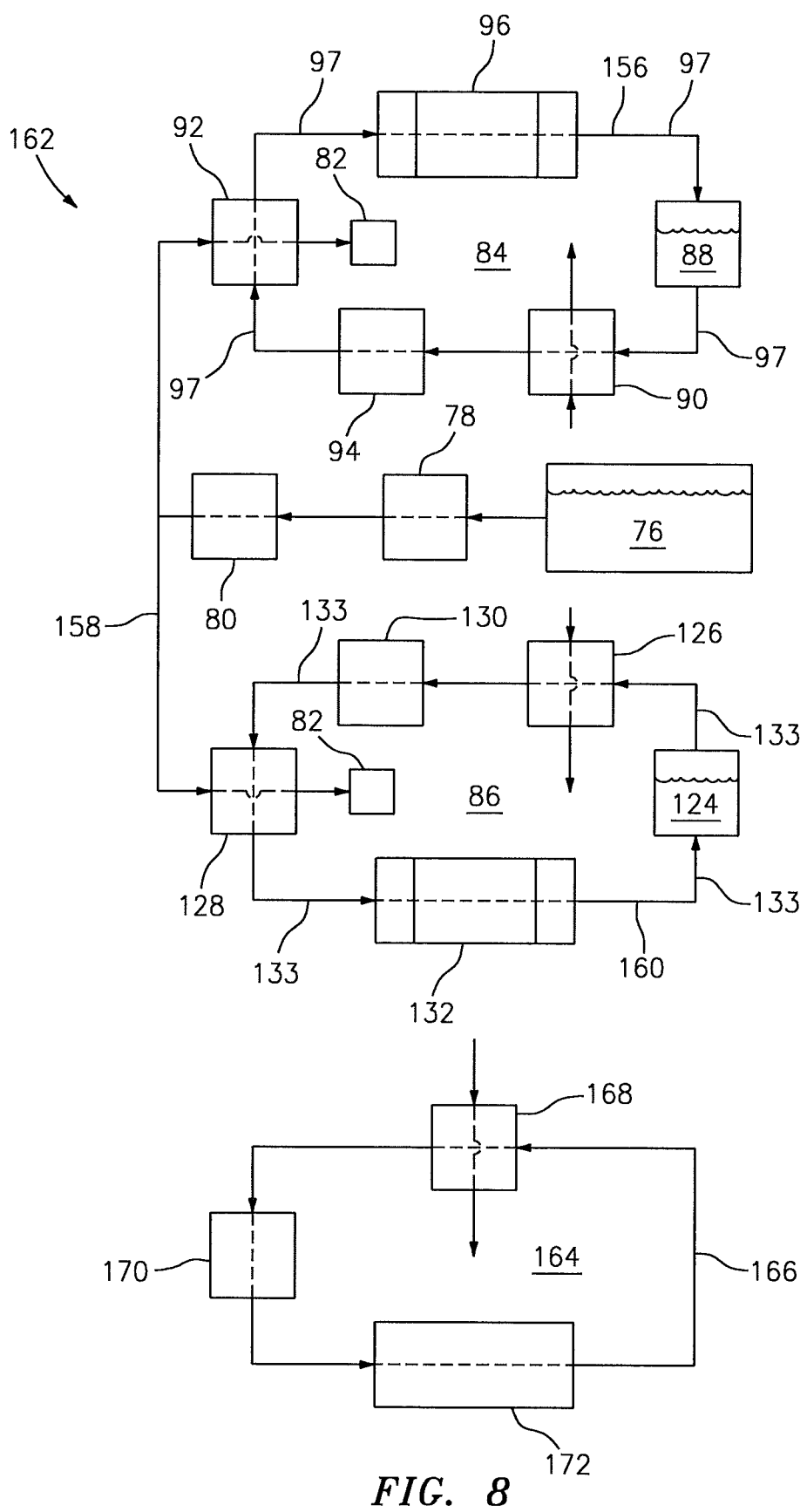
FIG. 8 is a schematic illustration of still another turbine engine system for the engine of FIG. 1.

FIG. 8 is a schematic illustration of another turbine engine system 162 for the engine 20 of FIG. 1. In contrast to the turbine engine system 70 of FIG. 4, the turbine engine system 162 further includes a third lubricant circuit 164. The third lubricant circuit 164 is configured as a closed-loop lubricant circuit, and is discrete from the first and/or the second lubricant circuits 84 and 86. The third lubricant circuit 164 includes and circulates third lubricant 166 through a lubricant heat exchanger 168 (e.g., a lubricant-air radiator), a lubricant pump 170 (e.g., a mechanical or electrical pump), and a generator 172. The third lubricant circuit 164 may also or alternatively include and provide lubricant to one or more components other than the generator 172.

The generator 172 is driven by a turbine engine component such as the accessory gearbox (not shown), one of the engine rotors 44-48, one of the shafts 34 and 36, or any other rotor included in the engine 20. The generator 172 may be configured to generate electrical power for electrical equipment such as a turbine engine control system, aircraft avionics, etc.

The terms "upstream", "downstream", "inner" and "outer" are used to orient the components described above relative to the turbine engine 20 and its axis 22. A person of skill in the art will recognize, however, one or more of these components may be utilized in other orientations than those described above. The present invention therefore is not limited to any particular component spatial orientations.

A person of skill in the art will recognize the disclosed turbine engine systems may be included in various turbine engines other than the one described above. The turbine engine systems, for example, may be included in a geared turbine engine where a gear train connects one or more shafts to one or more rotors in a fan section and/or a compressor section. Alternatively, the turbine engine systems may be included in a turbine engine configured without a gear train. The turbine engine systems may be included in a turbine engine configured with a single spool, with two spools as illustrated in FIG. 1, or with more than two spools. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine system, comprising:
   a fluid reservoir;
   a first lubricant circuit configured to circulate first lubricant sequentially through and comprising a gear train, a first lubricant reservoir, a first lubricant-air heat exchanger, a first pump and a first lubricant heat exchanger, the first lubricant heat exchanger comprising a first lubricant-fuel heat exchanger;
   a second lubricant circuit configured to circulate second lubricant through and comprising a bearing and a second lubricant heat exchanger, the second lubricant heat exchanger comprising a second lubricant-fuel heat exchanger, wherein the second lubricant is discrete from the first lubricant, and the first lubricant heat exchanger and the second lubricant heat exchanger are configured to receive fluid from the fluid reservoir in parallel;
   a plurality of engine stages, wherein the gear train connects a first of the plurality of engine stages to a second of the plurality of engine stages; and
   a shaft supported by the bearing, and connected to one of the plurality of engine stages.

2. The turbine engine system of claim 1, wherein
   the second lubricant circuit further comprises a second lubricant pump, a second lubricant reservoir and a second lubricant-air heat exchanger; and
   the second lubricant circuit is configured to circulate the second lubricant sequentially through the bearing, the second lubricant reservoir, the second lubricant-air heat exchanger, the second pump and the second lubricant heat exchanger.

3. The turbine engine system of claim 1, wherein the second lubricant circuit further comprises a second lubricant-air heat exchanger.

4. The turbine engine system of claim 1, wherein
   the first lubricant comprises a first type of lubricant; and
   the second lubricant comprises a second type of lubricant that is different than the first type of lubricant.

5. The turbine engine system of claim 1, wherein
   the first lubricant circuit directs the first lubricant through the gear train at a first pressure; and
   the second lubricant circuit directs the second lubricant through the bearing at a second pressure that is different than the first pressure.

6. The turbine engine system of claim 1, further comprising a third lubricant circuit comprising a third lubricant heat exchanger and a generator fluidly coupled with the third lubricant heat exchanger, the third lubricant circuit configured to flow a third lubricant through the third lubricant heat exchanger and into the generator.

7. The turbine engine system of claim 6, wherein the third lubricant heat exchanger is a lubricant-to-air radiator and the second fluid is air.

8. A turbine engine system, comprising:
   a fluid reservoir;
   a first lubricant circuit configured to circulate first lubricant through and comprising a gear train and a first lubricant heat exchanger, the first lubricant heat exchanger comprising a first lubricant-fuel heat exchanger;
   a second lubricant circuit configured to circulate second lubricant sequentially through and comprising a bearing, a second lubricant reservoir, a second lubricant-air heat exchanger, a second pump and a second lubricant heat exchanger, the second lubricant heat exchanger comprising a second lubricant-fuel heat exchanger, wherein the second lubricant is discrete from the first lubricant, and the first lubricant heat exchanger and the second lubricant heat exchanger are configured to receive fluid from the fluid reservoir in parallel;
   a plurality of engine stages, wherein the gear train connects a first of the plurality of engine stages to a second of the plurality of engine stages; and
   a shaft supported by the bearing, and connected to one of the plurality of engine stages.

9. The turbine engine system of claim 8, wherein
   the first lubricant circuit further comprises a first lubricant pump, a first lubricant reservoir and a first lubricant-air heat exchanger; and
   the first lubricant circuit is configured to circulate the first lubricant sequentially through the gear train, the first lubricant reservoir, the first lubricant-air heat exchanger, the first pump and the first lubricant heat exchanger.

10. The turbine engine system of claim 8, wherein
    the first lubricant comprises a first type of lubricant; and
    the second lubricant comprises a second type of lubricant that is different than the first type of lubricant.

11. The turbine engine system of claim 8, wherein
    the first lubricant circuit directs the first lubricant through the gear train at a first pressure; and
    the second lubricant circuit directs the second lubricant through the bearing at a second pressure that is different than the first pressure.

12. The turbine engine system of claim 8, further comprising a third lubricant circuit comprising a third lubricant heat exchanger and a generator fluidly coupled with the third lubricant heat exchanger, the third lubricant circuit configured to flow a third lubricant through the third lubricant heat exchanger and into the generator.

\* \* \* \* \*